(12) United States Patent
Payne

(10) Patent No.: US 6,308,741 B1
(45) Date of Patent: Oct. 30, 2001

(54) SCUFF COVER FOR STARTER HOSE OR CABLE

(75) Inventor: Roger A. Payne, Alliance, OH (US)

(73) Assignee: Salem-Republic Rubber Company, Sebring, OH (US)

( * ) Notice: Subject to any disclaimer, the term of this patent is extended or adjusted under 35 U.S.C. 154(b) by 0 days.

(21) Appl. No.: 09/573,606

(22) Filed: May 18, 2000

(51) Int. Cl.⁷ ...................................................... F16L 11/00
(52) U.S. Cl. ........................ 138/110; 138/122; 138/137; 138/125; 138/108
(58) Field of Search .................................. 138/110, 121, 138/122, 137, 140, 108, 125

(56) References Cited

U.S. PATENT DOCUMENTS

| | | | |
|---|---|---|---|
| 3,374,308 | * 3/1968 | Haas | 138/113 X |
| 4,589,448 | 5/1986 | del Valle | 138/122 |
| 4,892,442 | * 1/1990 | Shoffner | 138/108 X |
| 4,967,744 | * 11/1990 | Chua | 138/113 X |
| 5,046,531 | * 9/1991 | Kanao | 138/122 |
| 5,385,174 | * 1/1995 | Kanao | 138/122 |
| 5,441,082 | * 8/1995 | Eskew et al. | 138/112 |
| 5,486,649 | 1/1996 | Gareis | 174/36 |
| 5,979,508 | * 11/1999 | Cherrington | 138/110 X |
| 6,018,874 | 2/2000 | Todd | 30/210 |
| 6,152,185 | * 11/2000 | Tucker | 138/110 |

* cited by examiner

Primary Examiner—Patrick Brinson
(74) Attorney, Agent, or Firm—Buckingham, Doolittle & Burroughs, LLP; David P. Dureska, Esq.

(57) ABSTRACT

A scuff cover (10) for protecting an elongate inner element (14), such as a hose or a cable, comprises a flexible base tube (30) having an inner surface (34) defining a central passage (38) for movably receiving the inner element. The base tube (30) has an outer surface (36). A rub strip (40) projects from the outer surface (36) of the base tube (30). The rub strip (40) comprises an inner layer of material (42) on the base tube (30) and an outer layer of material (44). The outer layer of material (44) has a lower coefficient of friction than the inner layer of material (42) and forms the radially outermost surface of the scuff cover (10). The outer layer of material (44) is preferably ultrahigh molecular weight polyethylene.

25 Claims, 3 Drawing Sheets

SCUFF COVER FOR STARTER HOSE OR CABLE

BACKGROUND OF THE INVENTION

1. Technical Field

The present invention relates to a scuff cover. In particular, the present invention relates to a scuff cover for a jet starter hose or electrical cable, to protect it as it is dragged along the ground surface adjacent a jet airplane.

2. Description of the Prior Art

When a jet airplane is parked at a gate of an airport, the jet's engines are turned off, and the jet needs an external source of electrical power. Therefore, an electrical cable is plugged into the jet to supply electric power temporarily. The electrical cable is kept at a storage location near the gate when not in use. The electrical cable is pulled over from the storage location and connected to the jet. As the electrical cable is pulled over to the jet, the cable, which is heavy, drags along the ground surface and can wear. The heavy cable also can be difficult to pull along the ground.

Similarly, to start the jet's engines, a jet starter hose is plugged into the engine. The jet starter hose directs compressed air at a high flow rate against the turbine blades of the engine to start the engine. The jet starter hose, like the electrical cable, is heavy and is dragged along the ground surface to connect with the airplane.

It is typical to use a device called a "scuff cover" in this circumstance. The scuff cover is an outer tubular member enclosing the cable or hose. The inside diameter of the scuff cover is larger than the outside diameter of the cable or hose, so that the two can move independently of each other to bend and be coiled. The scuff cover has an outer surface which contacts the ground surface as the cable or hose is being dragged to the jet or to the storage location. Thus, the scuff cover takes any wear, rather than the functional cable or hose.

It is desirable that the scuff cover move along the ground surface as easily as possible, that is, with low friction. One known scuff cover includes an outer wrap of ultrahigh molecular weight polyethylene. This plastic material is wrapped over the entire outer surface of the scuff cover. This material exhibits a low coefficient of friction. The wrapping of the entire outer surface of the scuff cover, however, makes the scuff cover quite heavy and very stiff, both of which are undesirable qualities.

Another known scuff cover comprises a nylon mesh tube having a rub strip, or wear strip, on its outer surface. The rub strip is formed on the outer surface in a helical configuration. The rub strip covers only a percentage of the outer surface of the tube. The rub strip is made from rubber, however, resulting in a large amount of friction and substantial abrasion as the scuff cover is dragged along the ground surface.

SUMMARY OF THE INVENTION

The present invention is a scuff cover for protecting an elongate inner element such as a hose or a cable, the scuff cover comprises a flexible base tube having an inner surface defining a central passage for movably receiving the inner element. The base tube has an outer surface. A rub strip projects from the outer surface of the base tube. The rub strip comprises an inner layer of material on the base tube and an outer layer of material. The outer layer of material has a lower coefficient of friction than the inner layer of material and forms the radially outermost surface of the scuff cover. The outer layer of material is preferably ultrahigh molecular weight polyethylene. In another embodiment, the invention is a hose with a rube strip

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF EMBODIMENTS OF THE INVENTION

Figure 1:
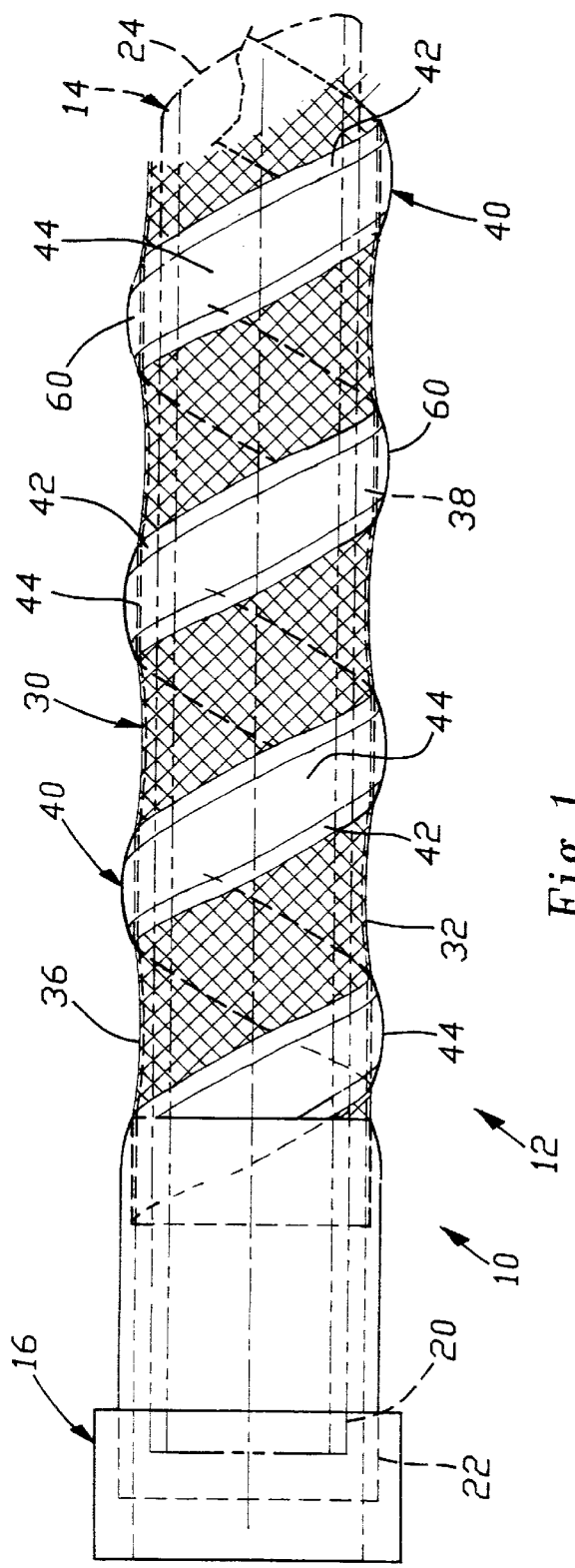
FIG. 1 is a side sectional view of a portion of a scuff cover constructed in accordance with a first embodiment of the present invention.

The present invention relates to a scuff cover. In particular, the present invention relates to a scuff cover for a jet starter hose or electrical cable, to protect it as it is dragged along the ground surface adjacent a jet airplane. As representative of the invention, FIG. 1 illustrates a portion of a scuff cover 10.

The scuff cover 10, described below in detail, is part of a hose assembly shown partially at 12. The hose assembly 12 includes, in addition to the scuff cover 10, a jet starter hose 14 and a coupling 16. The starter hose 14 extends through the scuff cover 10. An end portion 20 of the starter hose 14 is fixed to an end portion 22 of the scuff cover 10 by the coupling 16.

The hose assembly 12 is used in starting the engines of a jet airplane (not shown). When a jet airplane is parked at a gate of an airport, the jet's engines are turned off. To start the jet's engines, the coupling 16 of the hose assembly 12 is connected with the engine. The starter hose 14 has an internal passage 24 through which hot, compressed air is directed, at a high flow rate, against the turbine blades of the jet engine. The flow of air starts the engine running.

Figure 2:
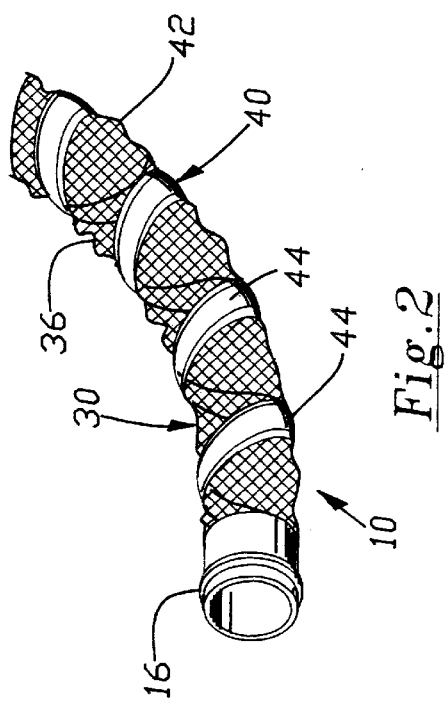
FIG. 2 is a view of the scuff cover of FIG. 1 in a bent or curved configuration.
Figure 3:
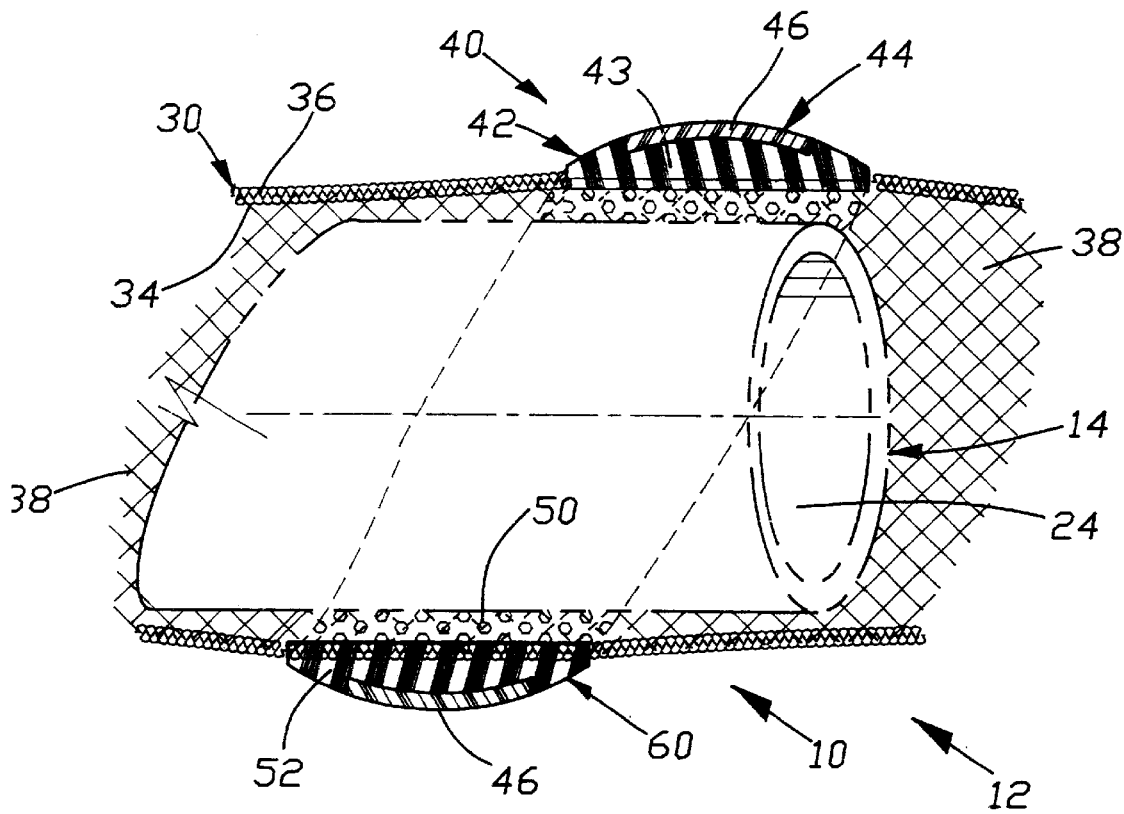
FIG. 3 is a sectional view through the scuff cover of FIG. 1.

The scuff cover 10 illustrated in FIGS. 1–3 includes a base tube 30. The material of the base tube 30 is selected for its light weight, flexibility, durability, and strength. In the illustrated embodiment, the base tube is made from a nylon mesh material 32, preferably Dacron.

The base tube 30 has a generally cylindrical cross-sectional configuration. The diameter of the base tube 30 may vary depending on the amount by which the base tube is stretched. The base tube 30 has opposite inner and outer surfaces 34 and 36. The inner surface 34 of the scuff cover defines a central opening 38 in the scuff cover 10. The starter hose 14 is received in and extends longitudinally through the central opening 38 in the scuff cover 10.

The scuff cover 10 also includes one or more wear strips, or rub strips, 40. In the illustrated embodiment, the scuff cover 10 includes a single rub strip 40 formed in a helical configuration on the outer surface 36 of the base tube 30. Other scuff covers in accordance with the invention may have more than one rub strip. Additionally, a scuff cover in accordance with the invention may have one or more rub strips formed in a configuration other than helical, such as a circular or hoop configuration.

The rub strip 40 includes two layers, or portions, of material. A first portion 42 of the rub strip 40 is made from rubber or a rubber-like material 43. A preferred material is a compound whose major polymer is typically SBR or EPDM, for example. This material 43 has the characteristics of flowability under heat, the ability to bond with the material of the base tube 30, and strength.

A second layer, or portion, 44 of the rub strip 40 is made from a plastic material 46. This material 46 has the characteristics of relatively light weight (as compared to the rubber first layer 42), durability when moved across a surface such as concrete or asphalt, and a low coefficient of friction. A preferred material is ultrahigh molecular weight polyethylene.

The scuff cover 10 is manufactured as follows. A cylindrical steel pole (not shown), or similar form, is provided. The pole has an outside diameter equal to the desired finished inside diameter of the scuff cover 10.

A single strip of the mesh material 32 of the base tube 30 of the scuff cover 40 is wrapped around the pole in a helical configuration, starting at one end and extending along the length of the pole. The mesh material 32 is wrapped around the pole so that the edge of one layer is overlapped by the edge of the next succeeding layer. Thus, the entire surface of the selected length of the pole is covered with the single strip of mesh material 32. The edge of the wrap forms a seam. The seam extends in a helical configuration along the length of the mesh material 32.

Next, a single strip of the rubber material 43 is wrapped around the pole in a helical configuration, starting at one end and extending along the length of the pole. The rubber material 43 is wrapped around the pole so that the rubber portion overlies, or covers, the seam formed by the mesh strip 32. This rubber material 43 will form the first portion 42 of the rub strip 40.

Next, a single strip of the ultrahigh molecular weight polyethylene plastic material 46 is wrapped around the pole in a helical configuration, starting at one end and extending along the length of the pole. The polyethylene material 46 is wrapped so that it overlies, or covers, the central portion of the rubber portion material 43 of the rub strip 40. This polyethylene material 46 forms the second portion 44 of the rub strip 40.

Then, a nylon overwrap (not shown) is placed on the entire outer surface of the scuff cover 10 as thus partially assembled. The scuff cover 10 and nylon overwrap are then placed into an autoclave or similar mechanism and subjected to heat, steam, and pressure. The heat softens the rubber material 43 of the first portion 42 of the rub strip 40.

One part 50 of the rubber material 43 flows into the interstices of the mesh material 32, to form a physical bond between the rubber material and the mesh material. Another part 52 of the rubber material 43 remains on top of the outer surface 36 of the mesh material 32. This part 52 of the rubber material 43 projects radially outward of the outer surface 36 of the mesh material 32. The plastic material 46, at this time, also is disposed radially outward of the outer surface 36 of the mesh material 32.

In the autoclave, the nylon overwrap shrinks radially inward by about three per cent. Thus, as the rubber material 43 softens, the plastic strip 46 is forced radially inward into the rubber material 43 until it is embedded in the rubber material. The outer surface 54 of the plastic strip 46 is flush with the outer surface 56 of the rubber material 43.

The scuff cover 10 and nylon overwrap are then removed from the autoclave and allowed to cool. The nylon overwrap is removed, and the scuff cover 10 has the finished configuration shown in the drawings.

The rub strip 40 as thus formed has a portion 60 that projects radially outward from the outer surface 36 of the base tube 30. The radially projecting portion 60 of the rub strip 40 includes the second part 52 of the rubber material 43. The radially projecting portion 60 of the rub strip 30 also includes the plastic material 46. The plastic material 44 is disposed radially outward of the outer surface 36 of the base tube 30.

The plastic material 44 is the radially outermost surface of the rub strip 40, and forms an outer layer of the rub strip 40. The rubber portion 42 of the rub strip 40 forms an inner layer of the rub strip.

The scuff cover 10 of the present invention is advantageous in that the plastic material 44 forms the radially outermost portion of the scuff cover. The plastic material 44 has a relatively low coefficient of friction as compared to the rubber portion 42, and so moves easily along a surface such as the ground surface adjacent a jet airplane. Therefore, the scuff cover 10 can be dragged relatively easily along such a surface. As compared to the rubber 42, which catches on the ground surface, the plastic 44 tends to skip across the ground surface.

In addition, the plastic material 44 is highly resistant to abrasion, as compared to rubber or rubber-like materials. Specifically, tests show that the plastic material 44 is eleven times more abrasion resistant than the rubber material 43, and thus more durable. Therefore, the scuff cover 10 exhibits relatively low wear in use.

The rub strip 40 preferably covers from about 10% to about 50% of the outer surface 36 of the base tube 30. A preferred percentage of coverage is about 35%. Because the rub strip 40 covers only a relatively small percentage of the outer surface 36 of the scuff cover 10, the amount of added weight is minimized. Also, the scuff cover 10 remains quite flexible even as compared to a similar scuff cover not having a rub strip. FIG. 2 shows the scuff cover 10 in a partially coiled configuration, for example; the scuff cover, with the elongate inner member inside it, would often be coiled for storage.

Figure 4:
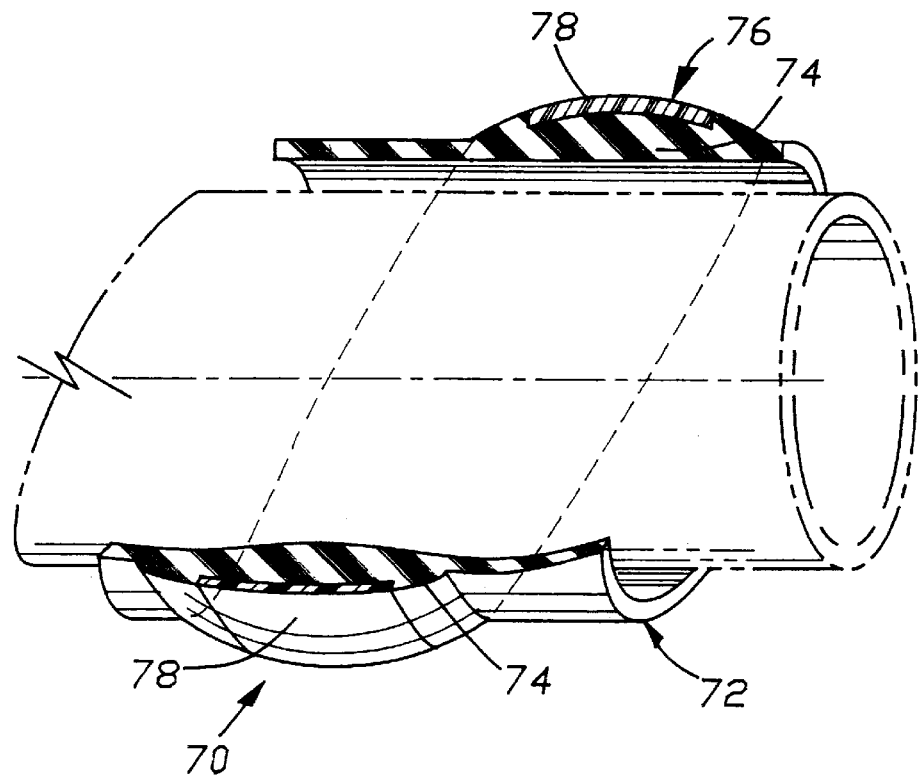
FIG. 4 is a sectional view, similar to FIG. 3, of a scuff cover constructed in accordance with a second embodiment of the present invention.

FIG. 4 illustrates a portion of a scuff cover 70 constructed in accordance with a second embodiment of the invention. The scuff cover 70 is generally similar in construction to the scuff cover 10 (FIGS. 1–3). In the second embodiment, however, the base tube is formed from the same material as the first part (the rubber part) of the rub strip.

Specifically, FIG. 4 illustrates a scuff cover 70 that includes a solid (not perforate, as in the first embodiment) base tube 72 formed from a rubber or rubber-like material. The first portion 74 of the rub strip 76 is formed as one piece with the base tube 72, for example, by molding. The second portion or outer layer 78 of the rub strip 76, the plastic part, is made from the same material as the second portion or outer layer 44 of the rub strip 40 in the first embodiment. The plastic material 78 is the radially outermost surface of the rub strip 76 and of the scuff cover 70, and forms an outer layer of the rub strip.

The scuff cover 70 is thus illustrative of a scuff cover in which the base tube is formed as one piece with a portion of the rub strip. Such a scuff cover 70 could be used to protect a separate internal hose as shown in FIG. 4. Such a scuff cover 70 could alternatively be used, for example, to carry fluids such as gas or liquid directly, that is, without a separate internal hose.

Figure 5:
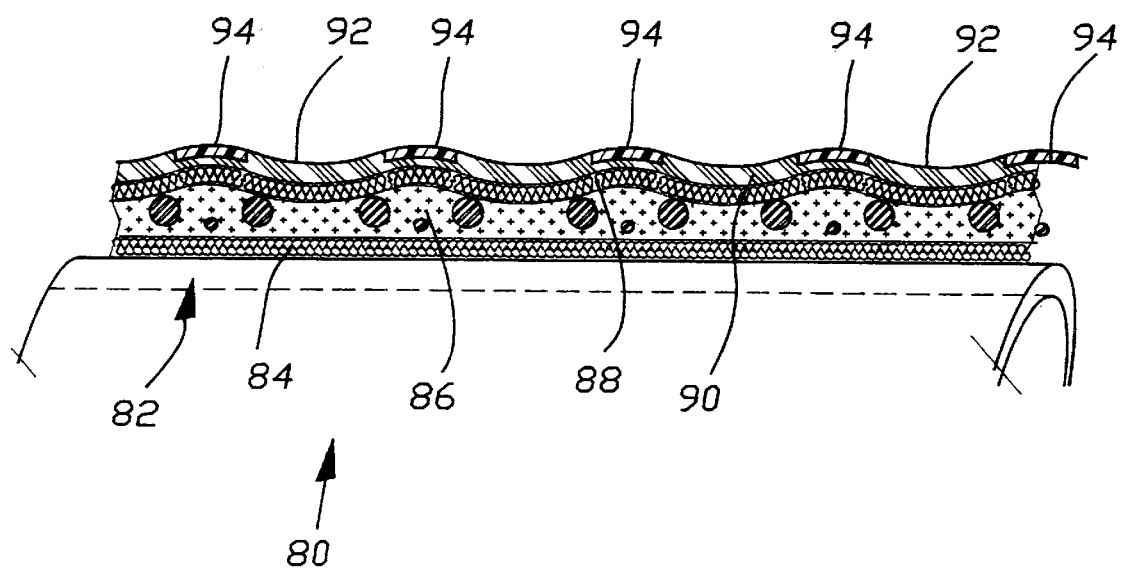
FIG. 5 is a sectional view of a scuff cover constructed in accordance with a third embodiment of the present invention.

FIG. 5 illustrates a portion of a scuff cover 80 constructed in accordance with a third embodiment of the invention. The scuff cover 80 comprises a base tube 82 of a construction generally known, including a plurality of layers 84, 86, 88 and 90 of material formed with a helically configured outer surface 92. A strip 94 of ultrahigh molecular weight polyethylene is embedded in the outer layer 90, at the outmost raised helical portions of the surface 92. The strip 94 forms the radially outermost surface of the scuff cover 80

From the above description of the invention, those skilled in the art will perceive improvements, changes and modifications in the invention. For example, the scuff cover can be used to protect and enclose an elongate inner element other than a hose or a cable. Such improvements, changes and modifications within the skill of the art are intended to be covered by the appended claims.

Having described the invention, I claim:

1. A scuff cover for protecting an elongate inner element such as a hose or a cable, said scuff cover comprising:
    a flexible base tube having an inner surface defining a central passage for movably receiving the inner element, said base tube also having an outer surface; and
    a rub strip projecting from said outer surface of said base tube;
    said rub strip comprising an inner layer of material on said base tube and an outer layer of material;
    said outer layer of material having a lower coefficient of friction than said inner layer of material and forming the radially outermost surface of said scuff cover.

2. A scuff cover as set forth in claim 1 wherein said inner layer of said rub strip is made from a different material than said base tube.

3. A scuff cover as set forth in claim 1 wherein said inner layer of said rub strip is made from the same material as said base tube.

4. A scuff cover as set forth in claim 3 wherein said inner layer of said rub strip is formed as one piece with said base tube.

5. A scuff cover as set forth in claim 1 wherein said outer layer of material is ultrahigh molecular weight polyethylene.

6. A scuff cover as set forth in claim 1 wherein said rub strip covers in the range of from about 10% of said outer surface of said base tube to about 50% of said outer surface of said base tube.

7. A scuff cover as set forth in claim 1 wherein said outer layer of material is embedded in said inner layer.

8. A scuff cover as set forth in claim 7 wherein said base tube is made from a mesh material having interstices and said inner layer of material extends at least partially into the interstices of said mesh material.

9. A scuff cover as set forth in claim 1 wherein said outer layer of material is made from ultrahigh molecular weight polyethylene, said outer layer of material is embedded in said inner layer, and said rub strip covers in the range of from about 10% of said outer surface of said base tube to about 50% of said outer surface of said base tube.

10. A scuff cover for protecting an elongate inner element such as a hose or a cable, said scuff cover comprising:
    a flexible mesh base tube defining a central passage for receiving the inner element, said base tube having an outer surface; and
    a rub strip having a portion projecting radially outward from said outer surface of said base tube;
    said projecting portion of said rub strip comprising an inner layer of a first material formed in a helical pattern on said outer surface of said base tube and extending into interstices of said mesh material to physically bond with said mesh material;
    said projecting portion of said rub strip further comprising an outer layer of a material made from ultrahigh molecular weight polyethylene;
    said outer layer of material having a lower coefficient of friction than said inner layer of material and forming the radially outermost surface of said scuff cover.
    said projecting portion of said rub strip covering in the range of from about 10% of said outer surface of said base tube to about 50% of said outer surface of said base tube.

11. An elongate tubular member comprising:
    a flexible base portion having an inner surface defining a central passage, said base portion also having an outer surface;
    a rub strip projecting from said outer surface of said base portion, said rub strip being formed in a pattern covering only a portion of said outer surface of said base portion;
    said rub strip comprising an inner layer of material and an outer layer of material;
    said outer layer of material having a lower coefficient of friction than said inner layer of material and forming the radially outermost surface of said rub strip.

12. A tubular member as set forth in claim 11 wherein said outer layer of material comprises ultrahigh molecular weight polyethylene and covers in the range of from about 10% of said outer surface of said base portion to about 50% of said outer surface of said base portion.

13. A tubular member as set forth in claim 11 wherein said rub strip is arranged in a helical pattern on said base portion.

14. A tubular member as set forth in claim 11 wherein said outer layer of material is ultrahigh molecular weight polyethylene.

15. A tubular member tubular member as set forth in claim 11 wherein said rub strip covers in the range of from about 10% of said outer surface of said base portion to about 50% of said outer surface of said base portion.

16. A tubular member as set forth in claim 11 wherein said outer layer of material is at least partially embedded in said inner layer.

17. A tubular member as set forth in claim 11 wherein said outer layer of material is made from ultrahigh molecular weight polyethylene, said outer layer of material is embedded in said inner layer, and said rub strip covers in the range of from about 10% of said outer surface of said base portion to about 50% of said outer surface of said base portion.

18. A scuff cover for protecting an elongate inner element such as a hose or a cable, said scuff cover comprising:
    a flexible base tube having an inner surface defining a central passage for movably receiving the inner element, said base tube also having an outer surface; and
    a rub strip projecting from said outer surface of said base tube;
    said rub strip comprising an inner layer of material on said base tube and an outer layer of material;
    said inner layer of material being formed from the same material as said base tube;
    said outer layer of material having a lower coefficient of friction than said inner layer of material and forming the radially outermost surface of said scuff cover.

19. A scuff cover for protecting an elongate inner element such as a hose or a cable, said scuff cover comprising:
   a flexible base tube having an inner surface defining a central passage for movably receiving the inner element, said base tube also having an outer surface; and
   a rub strip projecting from said outer surface of said base tube;
   said rub strip comprising an inner layer of material on said base tube and an outer layer of material;
   said inner layer of material being formed from the same material as and as one piece with said base tube;
   said outer layer of material having a lower coefficient of friction than said inner layer of material and forming the radially outermost surface of said scuff cover.

20. A scuff cover for protecting an elongate inner element such as a hose or a cable, said scuff cover comprising:
   a flexible base tube having an inner surface defining a central passage for movably receiving the inner element, said base tube also having an outer surface; and
   a rub strip projecting from said outer surface of said base tube;
   said rub strip comprising an inner layer of material on said base tube and an outer layer of material;
   said outer layer of material being embedded in and having a lower coefficient of friction than said inner layer of material and forming the radially outermost surface of said scuff cover.

21. A scuff cover for protecting an elongate inner element such as a hose or a cable, said scuff cover comprising:
   a flexible base tube formed from a mesh material having interstices, said base tube having an inner surface defining a central passage for movably receiving the inner element, said base tube further having an outer surface; and
   a rub strip projecting from said outer surface of said base tube;
   said rub strip comprising an inner layer of material on said base tube and an outer layer of material;
   said inner layer of material extending at least partially into the interstices of said mesh material;
   said outer layer of material being embedded in and having a lower coefficient of friction than said inner layer of material and forming the radially outermost surface of said scuff cover.

22. A scuff cover for protecting an elongate inner element such as a hose or a cable, said scuff cover comprising:
   a flexible base tube having an inner surface defining a central passage for movably receiving the inner element, said base tube also having an outer surface; and
   a rub strip projecting from said outer surface of said base tube and covering in the range of from about 10 percent of said outer surface of said base tube to about 50 percent of said outer surface of said base tube;
   said rub strip comprising an inner layer of material on said base tube and an outer layer of material;
   said outer layer of material being formed from ultrahigh molecular weight polyethylene, said outer layer of material further being embedded in and having a lower coefficient of friction than said inner layer of material and forming the radially outermost surface of said scuff cover.

23. An elongate tubular member comprising:
   a flexible base portion having an inner surface defining a central passage, said base portion also having an outer surface;
   a rub strip projecting from said outer surface of said base portion, said rub strip being formed in a helical pattern covering only a portion of said outer surface of said base portion;
   said rub strip comprising an inner layer of material and an outer layer of material;
   said outer layer of material having a lower coefficient of friction than said inner layer of material and forming the radially outermost surface of said rub strip.

24. An elongate tubular member comprising:
   a flexible base portion having an inner surface defining a central passage, said base portion also having an outer surface;
   a rub strip projecting from said outer surface of said base portion, said rub strip being formed in a pattern covering only a portion of said outer surface of said base portion;
   said rub strip comprising an inner layer of material and an outer layer of material;
   said outer layer of material being at least partially embedded in and having a lower coefficient of friction than said inner layer of material and forming the radially outermost surface of said rub strip.

25. An elongate tubular member comprising:
   a flexible base portion having an inner surface defining a central passage, said base portion also having an outer surface;
   a rub strip projecting from said outer surface of said base portion, said rub strip being formed in a pattern covering in the range of from about 10 percent of said outer surface of said base portion to about 50 percent of said outer surface of said base portion;
   said rub strip comprising an inner layer of material and an outer layer of material;
   said outer layer of material being formed from ultrahigh molecular weight polyethylene, said outer layer of material further being embedded in and having a lower coefficient of friction than said inner layer of material and forming the radially outermost surface of said rub strip.

* * * * *